(12) United States Patent
Phillips (10) Patent No.: US 8,091,520 B2
(45) Date of Patent: Jan. 10, 2012

(54) SPLIT-CYCLE ENGINE WITH EARLY CROSSOVER COMPRESSION VALVE OPENING

(75) Inventor: Ford A. Phillips, San Antonio, TX (US)

(73) Assignee: Scuderi Group, LLC, West Springfield, MA (US)

( * ) Notice: Subject to any disclaimer, the term of this patent is extended or adjusted under 35 U.S.C. 154(b) by 868 days.

(21) Appl. No.: 12/157,538

(22) Filed: Jun. 11, 2008

(65) Prior Publication Data

US 2009/0038598 A1 Feb. 12, 2009

Related U.S. Application Data

(60) Provisional application No. 60/963,742, filed on Aug. 7, 2007.

(51) Int. Cl.
*F02B 33/22* (2006.01)
*F02B 5/00* (2006.01)
*F02B 19/00* (2006.01)

(52) U.S. Cl. ........ 123/70 R; 123/305; 123/301; 123/261

(58) Field of Classification Search ............... 123/70 R, 123/52.1, 53.1, 53.3
See application file for complete search history.

(56) References Cited

U.S. PATENT DOCUMENTS

| | | | | |
|---|---|---|---|---|
| 3,774,581 A | * | 11/1973 | Lundy | 123/70 R |
| 5,833,765 A | | 11/1998 | Flynn et al. | |
| 5,857,436 A | * | 1/1999 | Chen | 123/70 R |
| 6,318,310 B1 | * | 11/2001 | Clarke | 123/70 R |
| 6,340,004 B1 | * | 1/2002 | Patton | 123/25 C |
| 6,340,013 B1 | * | 1/2002 | Britton | 123/255 |
| 6,880,501 B2 | * | 4/2005 | Suh et al. | 123/70 R |
| 7,383,798 B1 | * | 6/2008 | Antonov et al. | 123/70 R |
| 2005/0268609 A1 | | 12/2005 | Branyon et al. | |
| 2007/0157894 A1 | | 7/2007 | Scuderi et al. | |

* cited by examiner

*Primary Examiner* — Noah Kamen
*Assistant Examiner* — Grant Moubry
(74) *Attorney, Agent, or Firm* — Fildes & Outland, P.C.

(57) ABSTRACT

A split-cycle engine includes a crankshaft. A compression piston is received within a compression cylinder and operatively connected to the crankshaft such that the compression piston reciprocates through an intake stroke and a compression stroke during a single rotation of the crankshaft. An expansion piston is received within an expansion cylinder and operatively connected to the crankshaft such that the expansion piston reciprocates through an expansion stroke and an exhaust stroke during a single rotation of the crankshaft. A crossover passage interconnects the compression and expansion cylinders. The crossover passage includes a crossover compression (XovrC) valve and a crossover expansion (XovrE) valve defining a pressure chamber therebetween. The crossover compression valve is timed to open when the pressure in the compression cylinder is less than the upstream pressure in the crossover passage at the crossover compression valve.

16 Claims, 12 Drawing Sheets

SPLIT-CYCLE ENGINE WITH EARLY CROSSOVER COMPRESSION VALVE OPENING

CROSS REFERENCE TO RELATED APPLICATIONS

This application claims the benefit of U.S. Provisional Patent Application No. 60/963,742 filed Aug. 7, 2007.

TECHNICAL FIELD

The present invention relates to internal combustion engines. More specifically, the present invention relates to a split-cycle engine having a pair of pistons in which one piston is used for the intake and compression strokes and another piston is used for the expansion (or power) and exhaust strokes, with each of the four strokes being completed in one revolution of the crankshaft.

BACKGROUND OF THE INVENTION

For purposes of clarity, the term "conventional engine" as used in the present application refers to an internal combustion engine wherein all four strokes of the well known Otto cycle (i.e., the intake, compression, expansion and exhaust strokes) are contained in each piston/cylinder combination of the engine. Also for purposes of clarity, the following definition is offered for the term "split-cycle engine" as may be applied to engines disclosed in the prior art and as referred to in the present application.

A split-cycle engine as referred to herein comprises:
a crankshaft rotatable about a crankshaft axis;
a compression piston slidably received within a compression cylinder and operatively connected to the crankshaft such that the compression piston reciprocates through an intake stroke and a compression stroke during a single rotation of the crankshaft;
an expansion (power) piston slidably received within an expansion cylinder and operatively connected to the crankshaft such that the expansion piston reciprocates through an expansion stroke and an exhaust stroke during a single rotation of the crankshaft; and
a crossover passage interconnecting the compression and expansion cylinders, the crossover passage including a crossover compression (XovrC) valve and a crossover expansion (XovrE) valve defining a pressure chamber therebetween.

U.S. Pat. No. 6,543,225 granted Apr. 8, 2003 to Carmelo J. Scuderi (herein "Scuderi") contains an extensive discussion of split-cycle and similar type engines. In addition the patent discloses details of a prior version of an engine of which the present invention comprises a further development.

Figure 1:
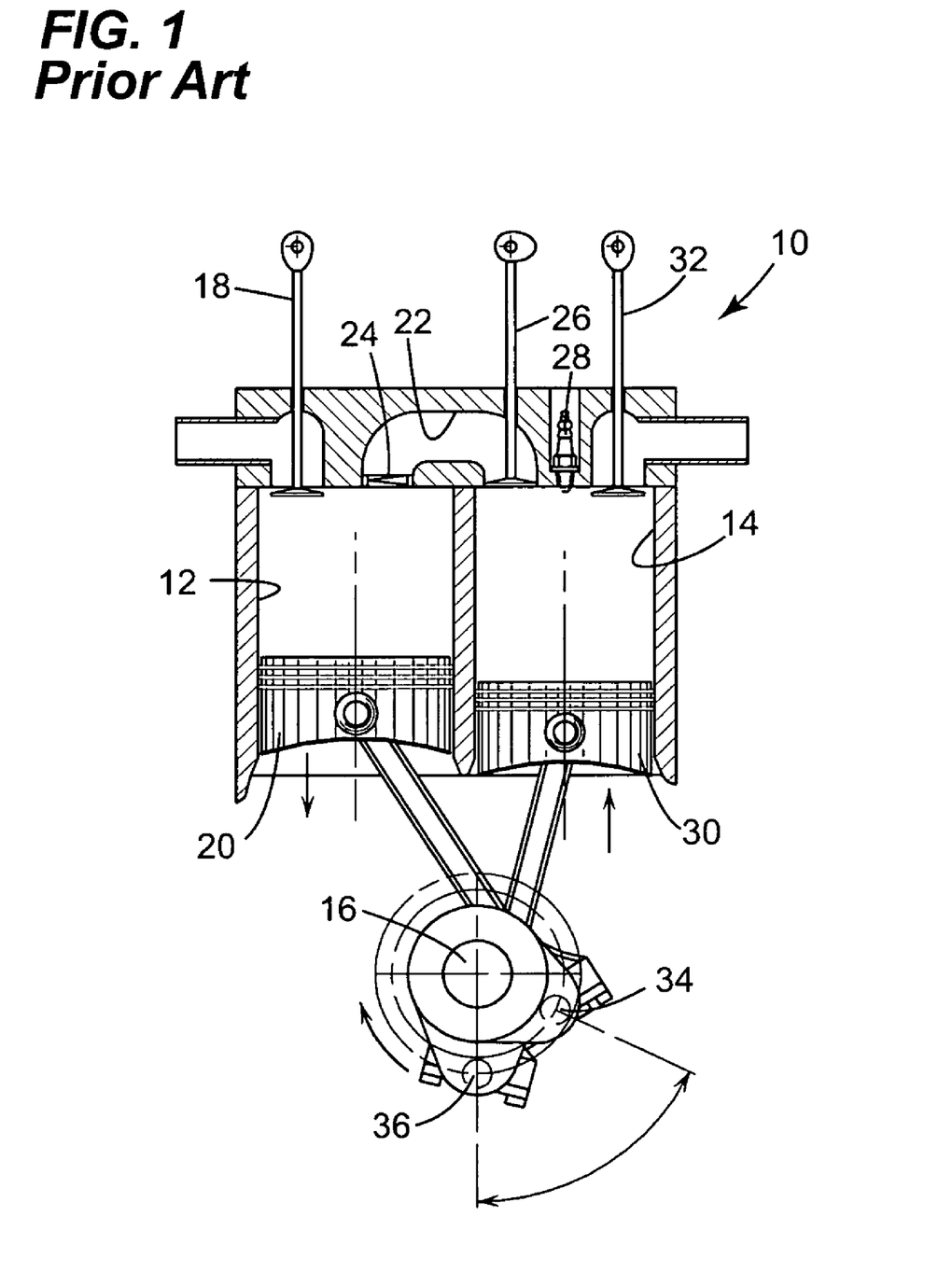
FIG. 1 is a transverse cross-sectional view of a prior art split-cycle engine related to the engine of the invention.

Referring to FIG. 1, an exemplary embodiment of a prior art split-cycle engine concept of the type described in Scuderi is shown generally by numeral 10. The split-cycle engine 10 replaces two adjacent cylinders of a conventional four-stroke engine with a combination of one compression cylinder 12 and one expansion cylinder 14. These two cylinders 12, 14 perform their respective functions once per crankshaft 16 revolution. The intake air and fuel charge is drawn into the compression cylinder 12 through typical poppet-style intake valves 18. The compression cylinder piston 20 pressurizes the charge and drives the charge through the crossover passage 22, which acts as the intake passage for the expansion cylinder 14.

A check type crossover compression (XovrC) valve 24 at the crossover passage inlet is used to prevent reverse flow from the crossover passage 22 into the compression cylinder 12. That is, the check valve 24 allows only one way flow of air from the compression cylinder 12 into the crossover passage 22.

A crossover expansion (XovrE) valve 26 at the outlet of the crossover passage 22 controls flow of the pressurized intake charge such that the charge fully enters the expansion cylinder 14 shortly after the expansion piston 30 reaches its top dead center (TDC) position. Spark plug 28 is fired soon after the intake charge enters the expansion cylinder 14 and the resulting combustion drives the expansion cylinder piston 30 down toward bottom dead center (BDC). Exhaust gases are pumped out of the expansion cylinder through poppet exhaust valves 32.

Figure 2:
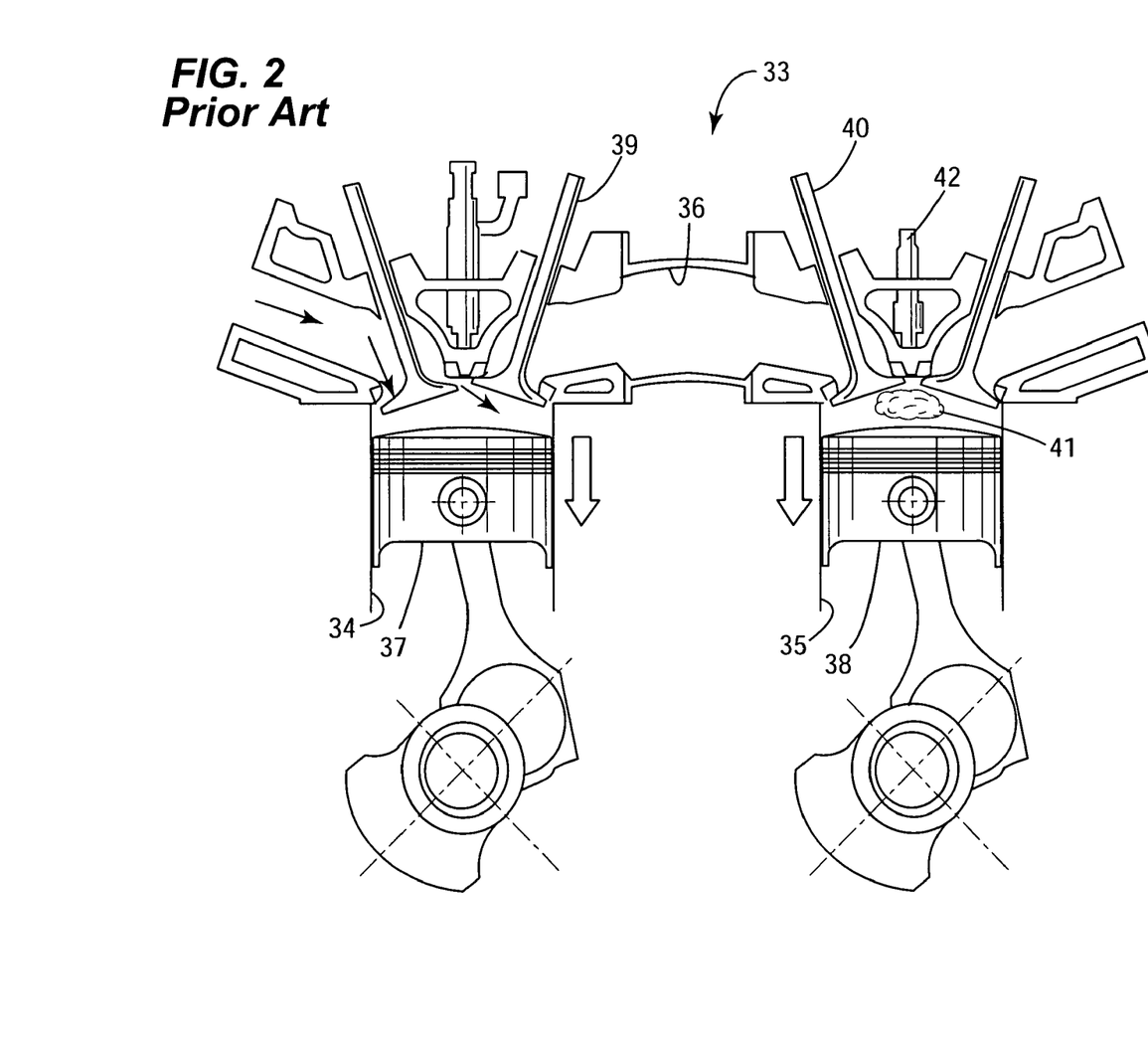
FIG. 2 is a schematic representation of another prior art split-cycle engine.

Referring to FIG. 2, an alternative prior art design of a split-cycle engine 33 is disclosed in U.S. Pat. No. 6,789,514 to Suh et al. (herein "Suh"). As illustrated in FIG. 2 (corresponding to Suh's FIG. 4a), split-cycle engine 33 includes a compression cylinder 34 and an expansion cylinder 35 interconnected by a crossover passage 36. A compression piston 37 and an expansion piston 38 reciprocate in cylinders 34 and 35, respectively. An inwardly opening poppet type XovrC valve 39 and an inwardly opening XovrE valve 40 control the flow of compressed fuel/air charge 41 through the crossover passage 36 and into expansion cylinder 35 where the charge 41 is ignited by a spark plug 42.

At least two ways in which Suh's split-cycle engine 33 differs from Scuderi's split-cycle engine 10 are:
1) the fuel/air charge 41 is ignited before expansion piston 38 reaches its TDC position (see Suh. column 14, lines 39-41) rather than after its TDC position; and
2) Suh's XoverC valve 39 is an inwardly opening poppet valve (see Suh. column 14, lines 29-30) rather than a check valve.

Figure 3:
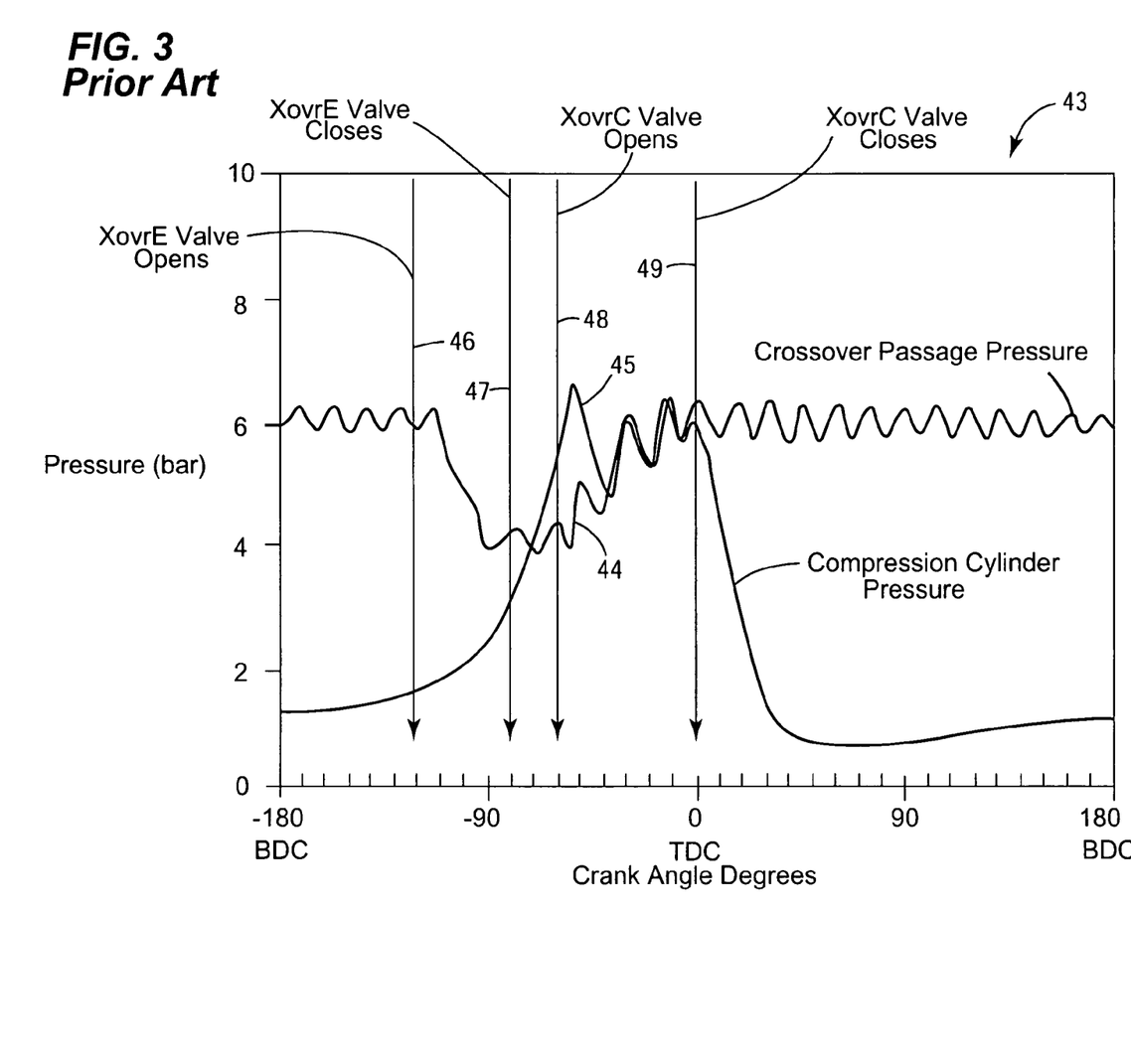
FIG. 3 is a pressure plot for the engine representation of FIG. 2.

Referring to FIG. 3 (corresponding to Suh's FIG. 5), Suh is similar to Scuderi in that it prevents reverse flow from the crossover passage 36 into the compression cylinder 34 by timing XovrC valve 39 to open late, i.e. to open when there is a positive pressure differential from cylinder 34 to passage 36. Graph 43 shows the relationship of crossover passage pressure (line 44) to compression cylinder pressure (line 45) as well as the timing of the XovrE valve opening (line 46), XovrE valve closing (line 47), XovrC valve opening (line 48) and XovrC valve closing (line 49). Since the XovrC valve is timed to open only at approximately 60 degrees before TDC of the compression piston 37, when the compression cylinder pressure 45 is greater than the crossover passage pressure 44, reverse flow from crossover passage 36 to compression cylinder 34 is prevented.

For split-cycle engines, especially for split-cycle engines which ignite their charge after the expansion piston reaches its top dead center position (such as Scuderi), the dynamic actuation of the crossover valves is very demanding. This is because the crossover valves 24 and 28 of Scuderi's engine 10 must achieve sufficient lift to fully transfer the fuel-air charge in a very short period of crankshaft rotation (generally about 30 degrees of crank angle) relative to that of a conventional engine, which normally actuates the valves within 180 to 220 degrees of crank angle. This means that the Scuderi crossover valves must be able to be actuated about six times faster than the valves of a conventional engine.

Increased valve lift and/or increased duration period of valve actuation generally enhances engine performance as it decreases flow restrictions and pumping work. However, valve lift and actuation period are generally limited by the possibility of reverse flow, which may increase pumping work and decrease engine performance. Additionally, valve lift and actuation period are limited by the valve train dynamics and valve impacts. This is especially so in the case of split-cycle engines with fast acting crossover valves. Therefore, there is need to increase the lift and/or duration period of actuation for the crossover valves of a split-cycle engine.

SUMMARY OF THE INVENTION

A split-cycle engine according to the invention may include a crankshaft rotatable about a crankshaft axis of the engine;

a compression piston slidably received within a compression cylinder and operatively connected to the crankshaft such that the compression piston reciprocates through an intake stroke and a compression stroke during a single rotation of the crankshaft;

an expansion piston slidably received within an expansion cylinder and operatively connected to the crankshaft such that the expansion piston reciprocates through an expansion stroke and an exhaust stroke during a single rotation of the crankshaft; and a crossover passage interconnecting the compression and expansion cylinders, the crossover passage including a crossover compression (XovrC) valve and a crossover expansion (XovrE) valve defining a pressure chamber therebetween;

wherein the crossover compression valve is timed to open when the pressure in the compression cylinder is less than the upstream pressure in the crossover passage at the crossover compression valve.

A method of operating a split-cycle engine including a crankshaft rotatable about a crankshaft axis of the engine;

a compression piston slidably received within a compression cylinder and operatively connected to the crankshaft such that the compression piston reciprocates through an intake stroke and a compression stroke during a single rotation of the crankshaft;

an expansion piston slidably received within an expansion cylinder and operatively connected to the crankshaft such that the expansion piston reciprocates through an expansion stroke and an exhaust stroke during a single rotation of the crankshaft; and a crossover passage interconnecting the compression and expansion cylinders, the crossover passage including a crossover compression (XovrC) valve and a crossover expansion (XovrE) valve defining a pressure chamber therebetween;

includes the step of timing the crossover compression valve to open when the pressure in the compression cylinder is less than the upstream pressure in the crossover passage at the crossover compression valve.

Additional features may include:

The crossover compression valve may be timed to open when the pressure in the compression cylinder is at least 5-15 bar less than the upstream pressure in the crossover passage.

The crossover compression valve may be timed to open at least 1.5-4.5 degrees crank angle before the pressure in the compression cylinder reaches the upstream pressure in the crossover passage.

These and other features and advantages of the invention will be more fully understood from the following detailed description of the invention taken together with the accompanying drawings.

DETAILED DESCRIPTION OF THE INVENTION

Glossary

The following glossary of acronyms and definitions of terms used herein is provided for reference:

Pumping work (or PV work): Pumping work is defined as the work expended to move the intake and exhaust gases into and out of the cylinder(s), across the pressure drops caused by valves and any other restrictions in the gas flows. It is generally calculated as the integral of the pressure drop(s) multiplied by the volume flow(s), and thus this calculation is usually abbreviated as "PV work".

Early XovrC valve opening: Early crossover compression valve opening is defined generally as any valve opening before a positive pressure develops across the valve.

Engine full load or 100% engine load: The maximum torque that an engine can produce at a given speed.

Indicated torque: The torque output at the engine piston crown, calculated before effects of engine mechanical friction and auxiliary system losses.

Brake torque: The torque output at the engine output shaft.

Naturally aspirated engine: A naturally aspirated engine is an engine with an intake stroke that is not boosted by a turbocharger, supercharger or the like.

Brake mean effective pressure: The engine's brake torque output expressed in terms of a mean effective pressure value. It is equal to the brake engine torque divided by engine displacement volume.

Indicated mean effective pressure: It is equal to the indicated engine torque divided by engine displacement volume.

Top dead center: the closest position to the cylinder head that the piston reaches throughout the cycle, providing the lowest cylinder volume.

Valve opening: For purposes herein, valve opening will be considered a valve lift of at least 0.06 millimeters.

Crank angle: The angle of rotation of the crankshaft.

Description

Figure 4:
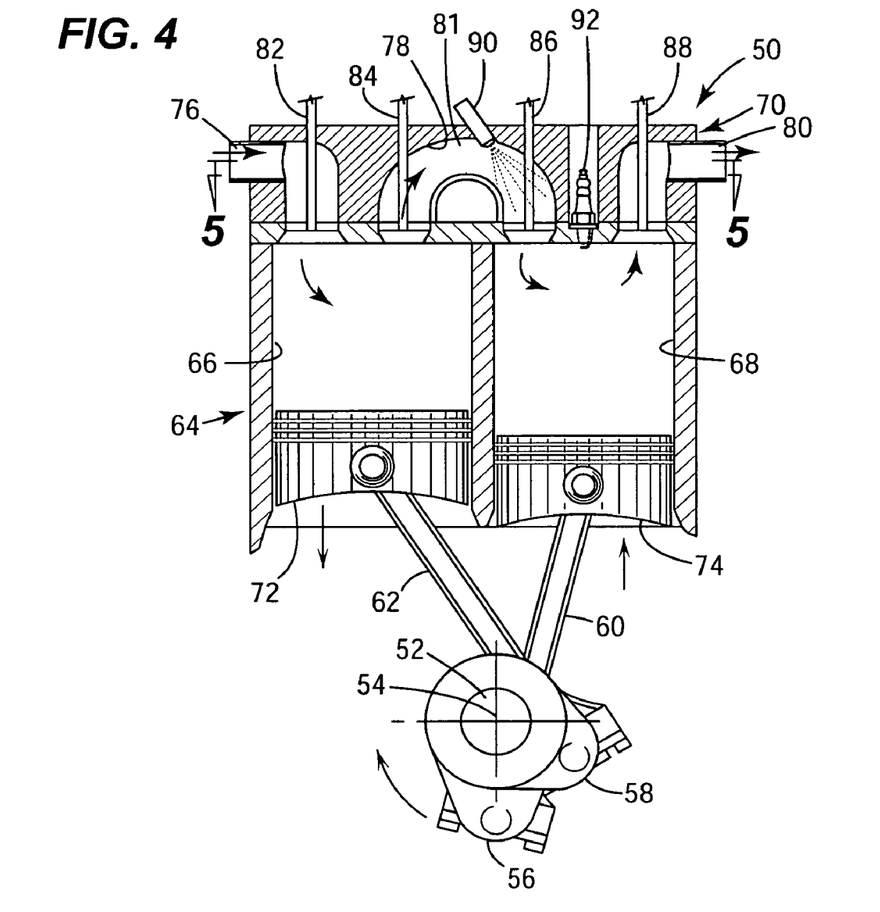
FIG. 4 is a transverse cross-sectional view of an exemplary split-cycle engine according to the present invention.
Figure 5:
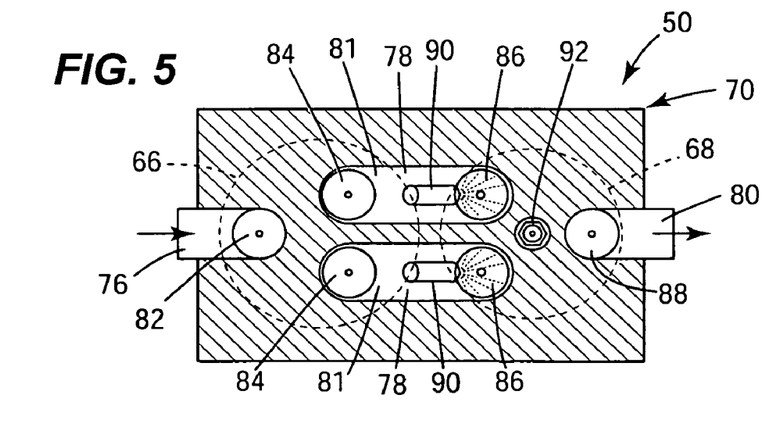
FIG. 5 is a cross-sectional top view of the split-cycle engine of FIG. 4 taken through line 5-5 of FIG. 4 with fuel injectors superimposed.

Referring now to FIGS. 4 and 5 of the drawings in detail, numeral 50 generally indicates an exemplary embodiment of a split-cycle engine having early opening crossover compression (XovrC) valves 84 in its crossover passages 78 in accordance with the present invention. As will be discussed in greater detail herein, the early opening XovrC valves 84 are timed to open when the pressure in the compression cylinder 66 is less than the pressure in the crossover passages 78 (i.e. there is a negative pressure differential across the XovrC valves 84). Advantageously, the early opening XovrC valves 84 provide a greater period of valve actuation and greater valve lift, which results in enhanced split-cycle engine 50 performance.

Engine 50 includes a crankshaft 52 rotatable about a crankshaft axis 54 in a clockwise direction as shown in the drawing. The crankshaft 52 includes adjacent angularly displaced leading and following crank throws 56, 58, connected to connecting rods 60, 62, respectively.

Engine 50 further includes a cylinder block 64 defining a pair of adjacent cylinders. In particular, engine 50 includes a compression cylinder 66 and an expansion cylinder 68 closed by a cylinder head 70 at an upper end of the cylinders opposite the crankshaft 52.

A compression piston 72 is received in compression cylinder 66 and is connected to the connecting rod 62 for reciprocation of the piston 72 between top dead center (TDC) and bottom dead center (BDC) positions. An expansion piston 74 is received in compression cylinder 68 and is connected to the connecting rod 60 for similar TDC/BDC reciprocation.

The cylinder head 70 provides the structure for gas flow into, out of and between the cylinders 66, 68. In the order of gas flow, the cylinder head 70 includes an intake passage (or port) 76 through which intake air is drawn into the compression cylinder 66, a pair of crossover (Xovr) passages 78, through which compressed air is transferred from the compression cylinder 66 to the expansion cylinder 68, and an exhaust passage 80 through which spent gases are discharged from the expansion cylinder. Each crossover passage 78 also defines a pressure chamber 81 in which pressurized gas is stored when the crossover valves are closed.

Gas flow into the compression cylinder 66 is controlled by an inwardly opening poppet type intake valve 82. Gas flow into and out of each crossover passage 78 may be controlled by a pair of outwardly opening poppet valves, i.e. crossover compression (XovrC) valves 84 at inlet ends of the crossover passages and crossover expansion (XovrE) valves 86 at outlet ends of the crossover passages. Exhaust gas flow out the exhaust passage 80 is controlled by an inwardly opening poppet type exhaust valve 88. These valves 82, 84, 86 and 88 may be actuated in any suitable manner such as by mechanically driven cams, variable valve actuation technology, or the like.

Each crossover passage has at least one high pressure fuel injector 90 disposed therein. The fuel injectors are operative to inject fuel into charges of compressed air within the pressure chambers 81 of the crossover passages 78.

Engine 50 also includes one or more spark plugs 92 or other ignition devices. The spark plugs 92 are located at appropriate locations in the end of the expansion cylinder 68 wherein a mixed fuel and air charge may be ignited and burn during the expansion stroke.

A computer study was utilized to optimize the various geometric parameters of the split-cycle engine 50, including the timing of the outwardly opening XorvC poppet valves 84. With regard to optimization of the XovrC valves 84, virtually all split-cycle engine art taught that prevention of reverse flow was required for optimal performance, as exemplified in the previously discussed prior art Scuderi and Suh patents.

Additionally, the relationship between reverse flow, especially reverse flow across the XovrC valves 84, and split-cycle engine performance (e.g. torque, pressure, mass flow, and the like) was not previously known. Moreover, the degree of uncertainty on the effect of reverse flow on the split-cycle engine 50 performance was compounded because engine 50 included outwardly opening XovrC valves 84 which open away from the compression cylinder 66, whereas other split-cycle engine prior art utilized either check valves (as in Scuderi) or inwardly opening poppet valves (as in Suh) for the XovrC valves. Accordingly, due to these unknowns, the computer study included a sweep of various early opening timings for the XovrC valves 84, which induced reverse flow. The computer study yielded unexpected results which are described in detail herein.

Figure 6:
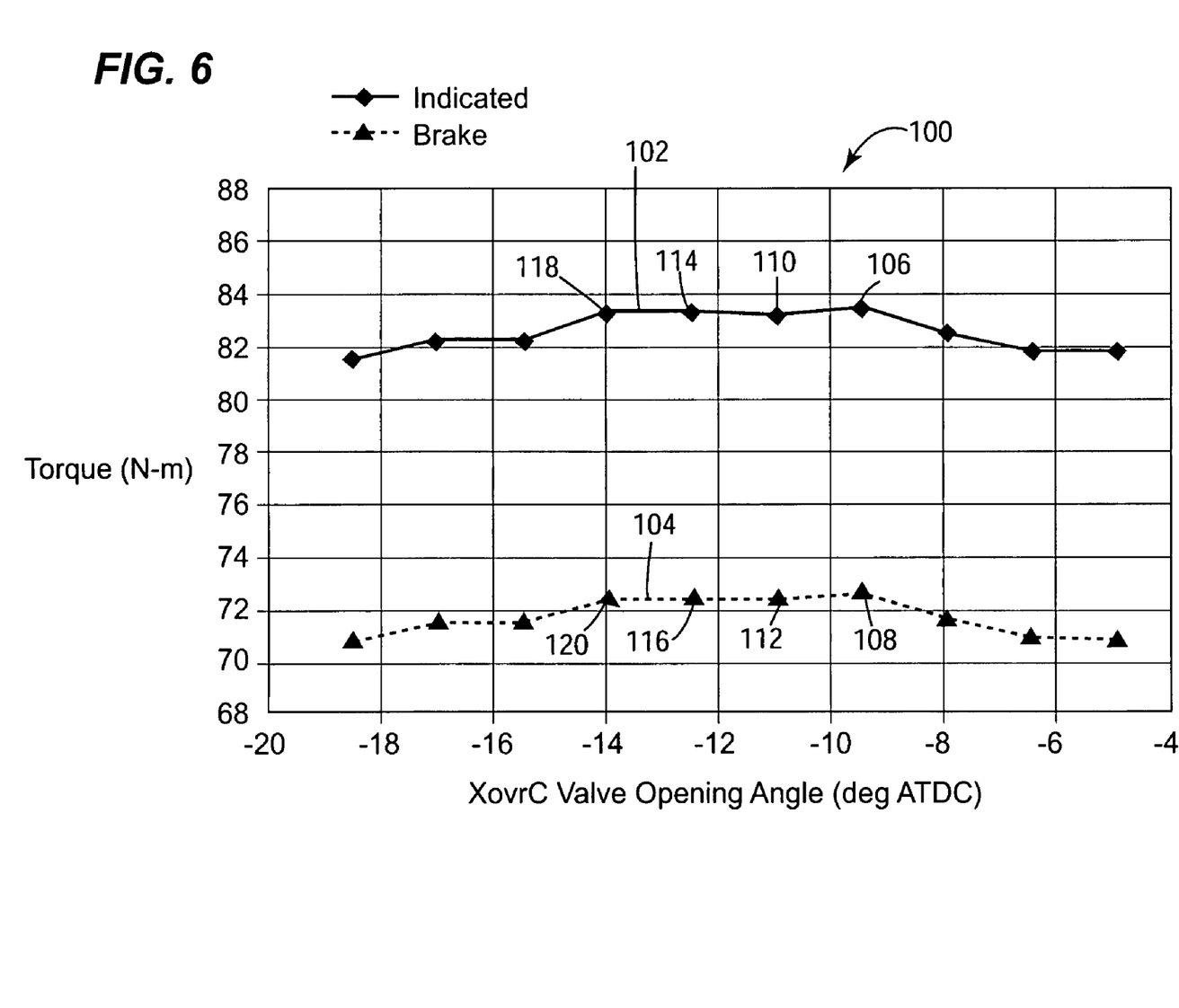
FIG. 6 is a graph of indicated and brake torques predicted for the engine of FIGS. 4 and 5 at various crossover compression (XovrC) valve opening crank angles at constant peak lift.

Referring to FIG. 6, graph 100 shows the computer study predicted results for split-cycle engine 50 "indicated torque" and "brake torque" vs. crossover compression valve 84 opening crank angle at constant peak lift for a naturally aspirated split-cycle engine 50 cycle simulation at 4000 RPM and 100% engine load. Plotted line 102 represents indicated torque in Newton-meters and plotted line 104 represents brake torque in Newton-meters. The torques were calculated for each 1.5 degree crank angle (CA) increment from 18.5 degrees CA before top dead center (BTDC) (i.e., −18.5 degrees CA after top dead center (ATDC)) to 5 degrees CA BTDC relative to the TDC position of the expansion piston 74.

The baseline timing for the crossover compression valve 84 opening was 9.5 degrees CA BTDC of the expansion piston (i.e., reference point 106 for indicated torque and reference point 108 for brake torque). That is, at 9.5 degrees CA BTDC, the XovrC valve 84 was timed to open slightly early, wherein reverse flow across the XovrC valve 84 was minimal but detectable.

As expected, later timings resulted in decreases in torque. However, unexpectedly, earlier timings had negligible effect until earlier than 14 degrees BTDC (reference numbers 118 and 120) of the expansion piston 74. That is, the predicted indicated and brake torques did not change significantly when XovrC valve 84 was opened at least 1.5 degrees CA early (reference points 110 and 112), at least 3.0 degrees CA early (reference points 114 and 116), or at least 4.5 degrees CA early (reference points 118 and 120) relative to the baseline of 9.5 degrees CA BTDC of the expansion piston 74.

Figure 7:
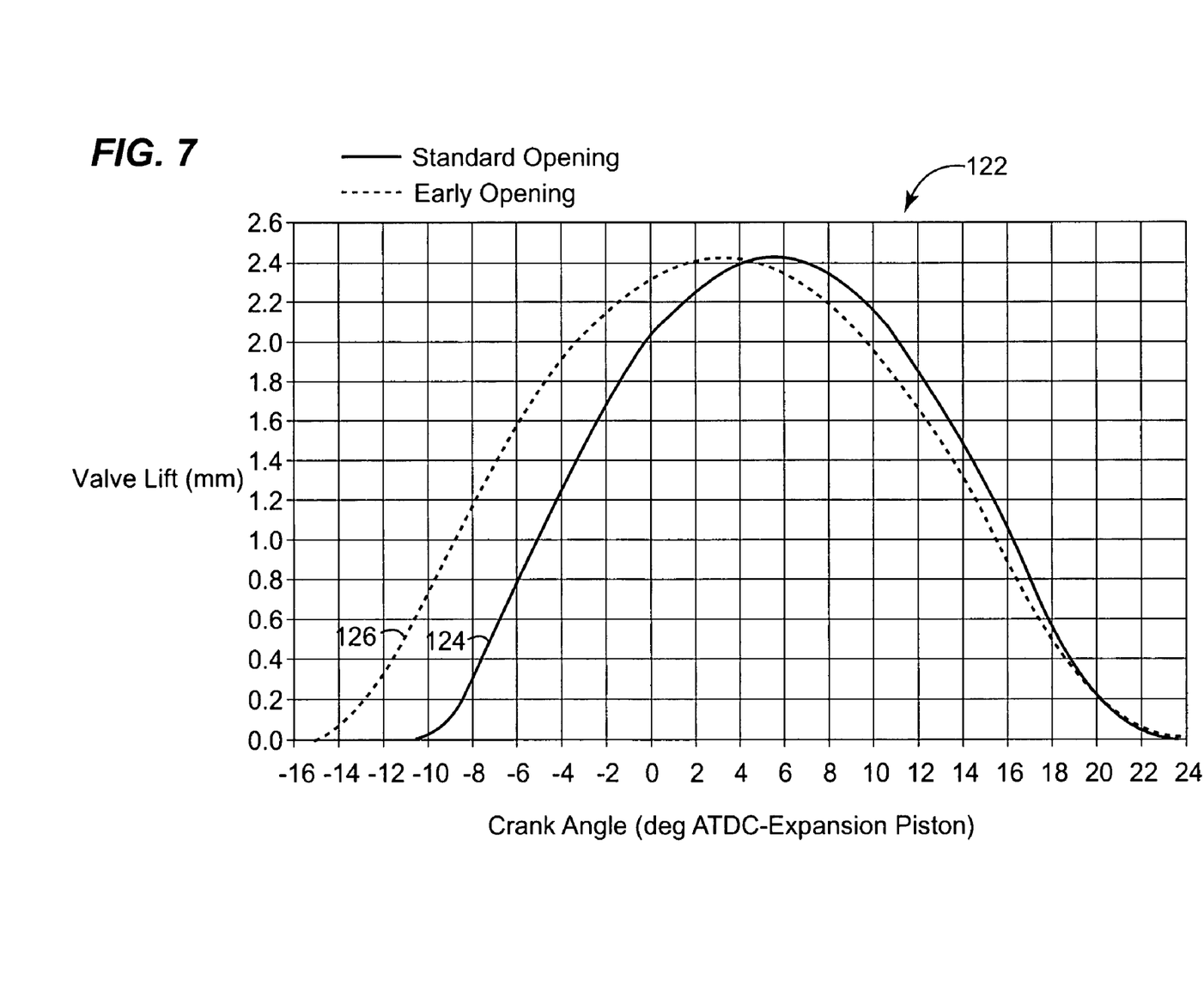
FIG. 7 is a graph of XovrC valve lift vs. crank angle for baseline and early opening crossover valves at constant peak lift.

Referring to FIG. 7, graph 122 shows the valve lift profiles at constant peak lift of the XovrC valve 84 when actuation is started at the baseline point of 9.5 degrees CA BTDC (curve 124) and when actuation is started 4.5 degrees CA early (curve 126). Note that the area under curve 126 is much larger than the area under curve 124, which means there is more open volume for air mass flow to travel through during the larger actuation period of the earlier actuated XovrC valve 84.

Figure 8:
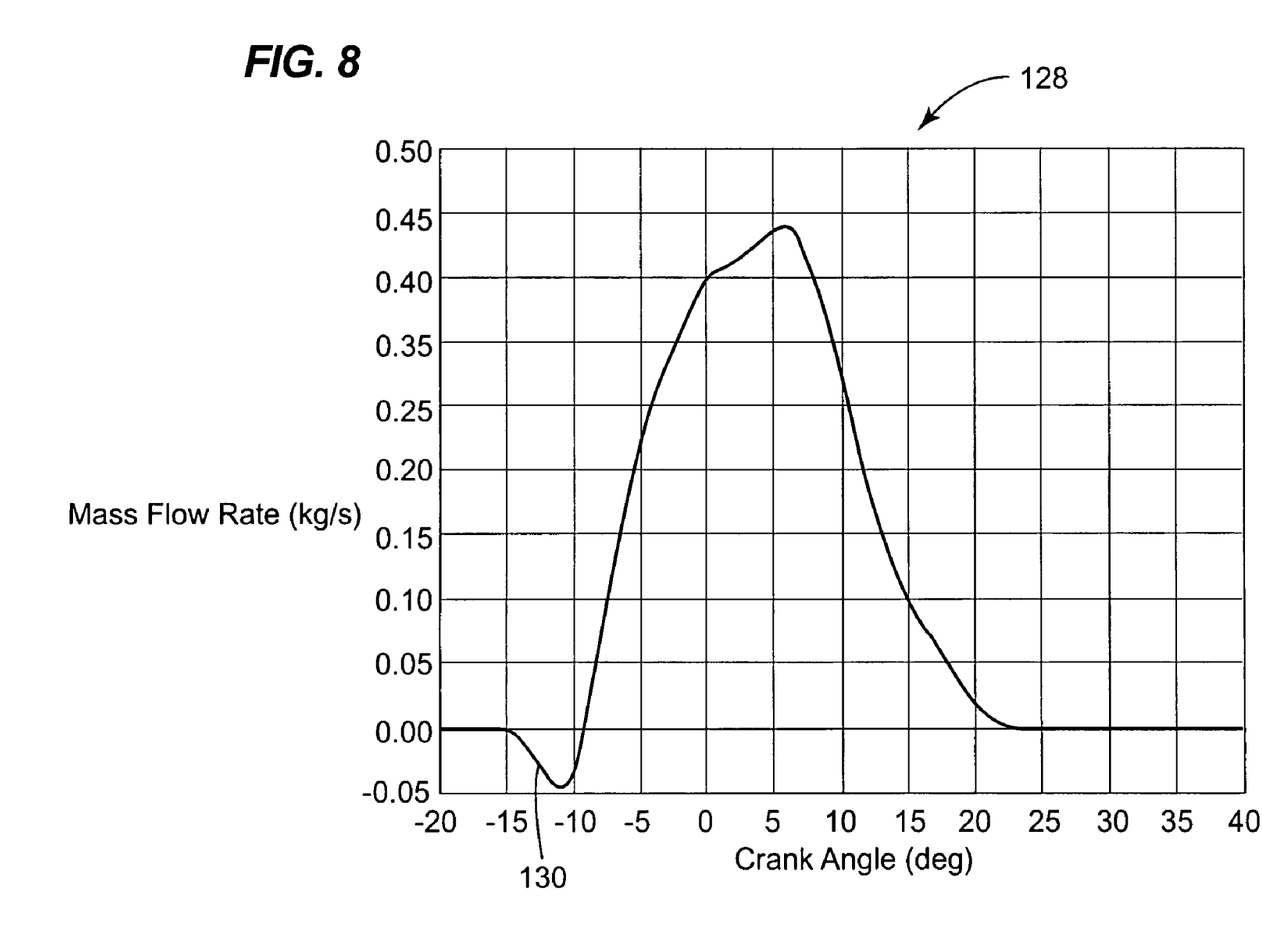
FIG. 8 is a graph of mass air flow rate vs. crank angle for an early opening XovrC valve of the invention having initial reverse flow.

Referring to FIG. 8, graph 128 is a plot of mass flow rate vs. crank angle for the XovrC valve 84 with an early opening timing advanced by 4.5 degrees CA. As plotted in curve 130, there is significant reverse flow between 14 and 9.5 degrees CA BTDC of the expansion piston 74, where the pressure delta across the XorvC valve 84 is negative (i.e., pressure in the compression cylinder 68 is less than the pressure in the crossover passage 78) Once the 9.5 degree CA BTDC point is reached, the pressure delta becomes positive (i.e., pressure in the compression cylinder 68 exceeds the pressure in the crossover passage 78) and the mass flow rate reverts to the forward direction.

Figure 9:
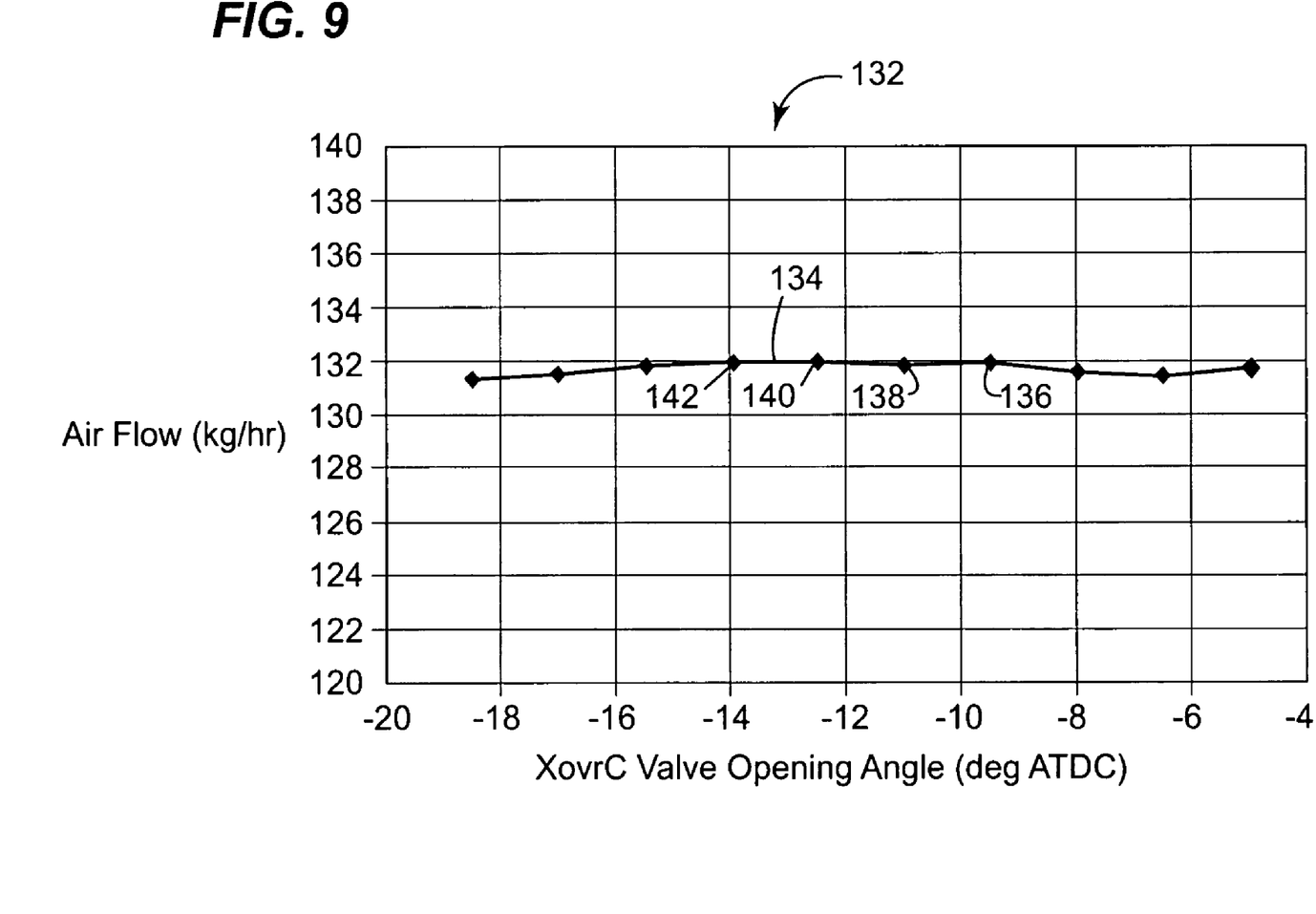
FIG. 9 is a graph of air flow vs. XovrC valve opening crank angle for various valve opening timing values at constant peak lift.

Referring to FIG. 9, graph 132 is a plot of air flow vs. XovrC valve 84 opening timing at constant peak lift. Again the XovrC valve was stepped in 1.5 degree increments from 5 degrees CA BTDC to 18.5 degrees CA BTDC of the expansion piston 74 as shown in curve 134. Curve 134 shows that despite the initial reverse flow with the early valve opening timing, the overall air flow is the same as the baseline timing of 9.5 degrees CA BTDC (reference point 136). That is, regardless of whether the XovrC valve 84 was opened just early (reference point 136), 1.5 degrees CA early (reference point 138), 3.0 degrees CA early (reference point 140), or 4.5 degrees CA early (reference point 142), the air flow was approximately 132 kilograms/hour.

Figure 10:
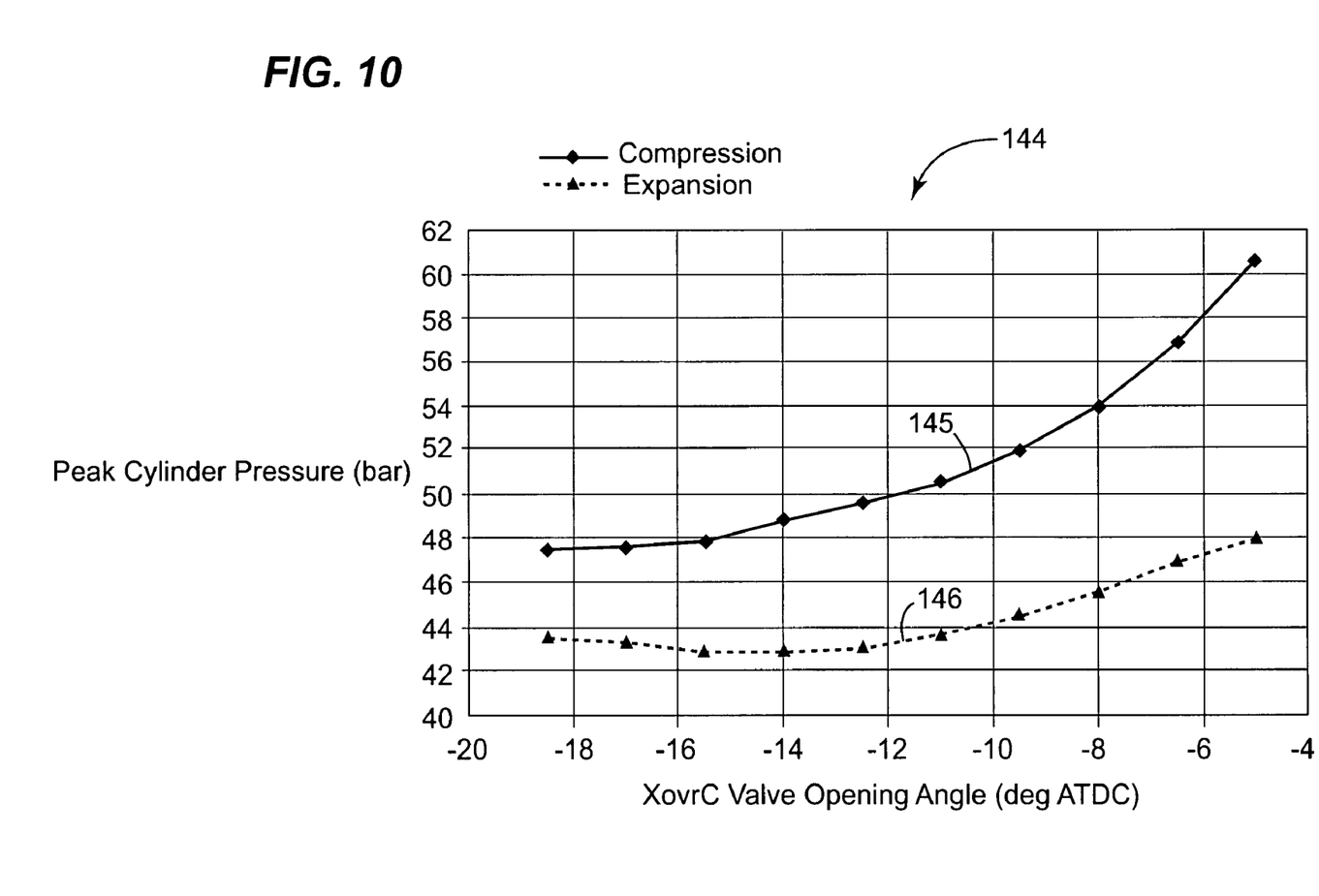
FIG. 10 is a graph of compression and expansion cylinder maximum pressures at various XovrC valve opening timing angles at constant peak lift.

Referring to FIG. 10, graph 144 shows that advancing the timing from 9.5 to 14 degrees BTDC at constant peak lift also reduces the peak cylinder pressures in both cylinders, with the greater effect on the compression cylinder. That is, peak compression cylinder pressure (shown in curve 145) dropped from 52 bar to about 48.5 bar, while peak expansion cylinder pressure (shown in curve 146) dropped from approximately 44.5 bar to 43 bar, when timing was advanced from 9.5 to 14 degrees BTDC. Lowering the cylinder pressures reduces the cylinder friction, which could explain why there is not a loss in torque with timing advance, even with the increased pumping of the reversed initial flow.

Figure 11:
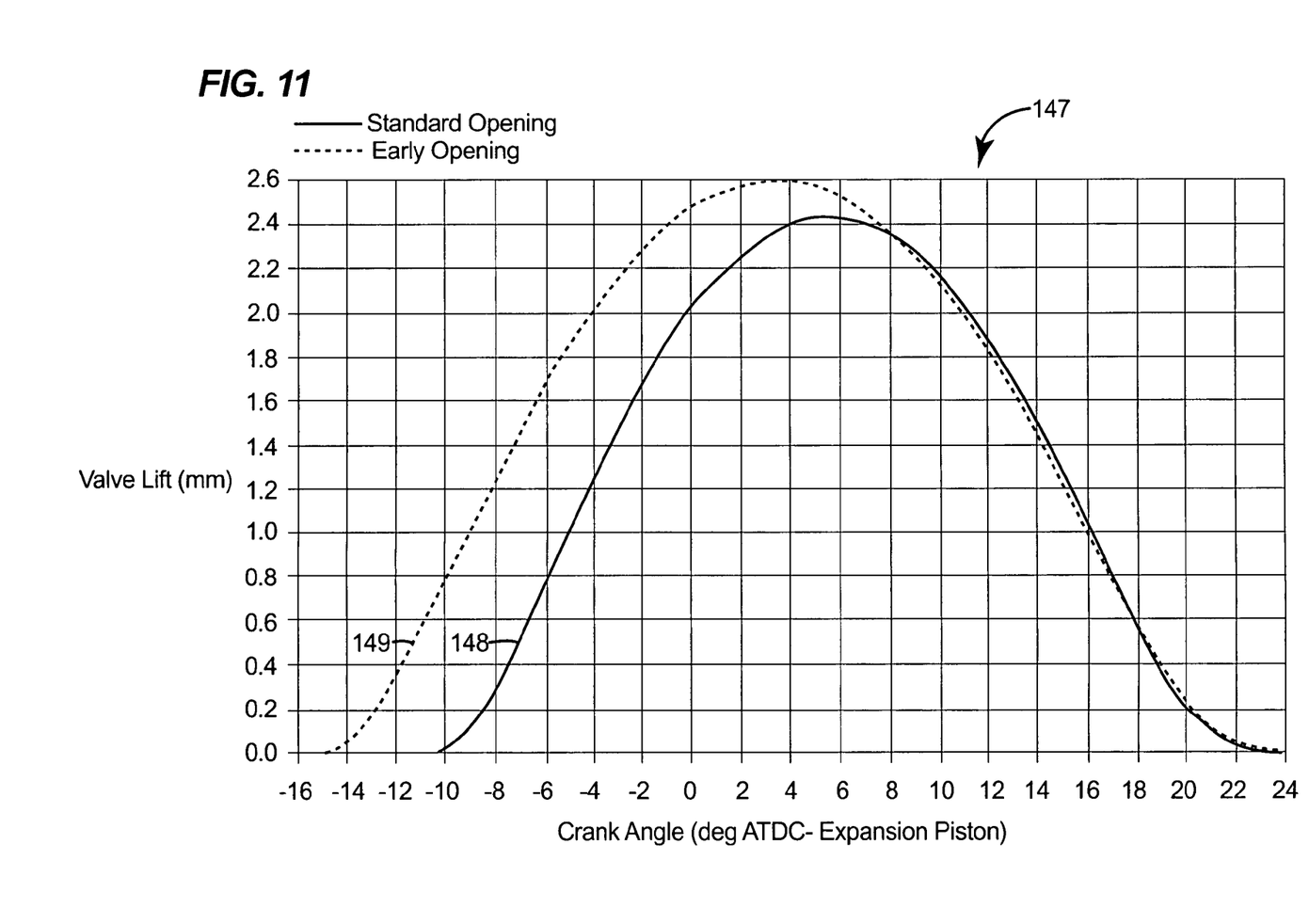
FIG. 11 is a graph of XovrC valve lift vs. crank angle for baseline and early opening crossover valves with variable peak lifts.

Referring to FIG. 11, graph 147 shows that the increase in crossover compression valve 84 opening duration also allowed for an additional increase in peak valve lift, from 2.43 mm (curve 148) to 2.60 mm (curve 149). That is, given the same acceleration and deceleration rates for valve lift curves 148 and 149, a higher peak lift of 2.60 mm could be attained in early opening valve curve 149 with its larger opening duration, than the peak lift of 2.43 mm for baseline valve curve 148.

Figure 12:
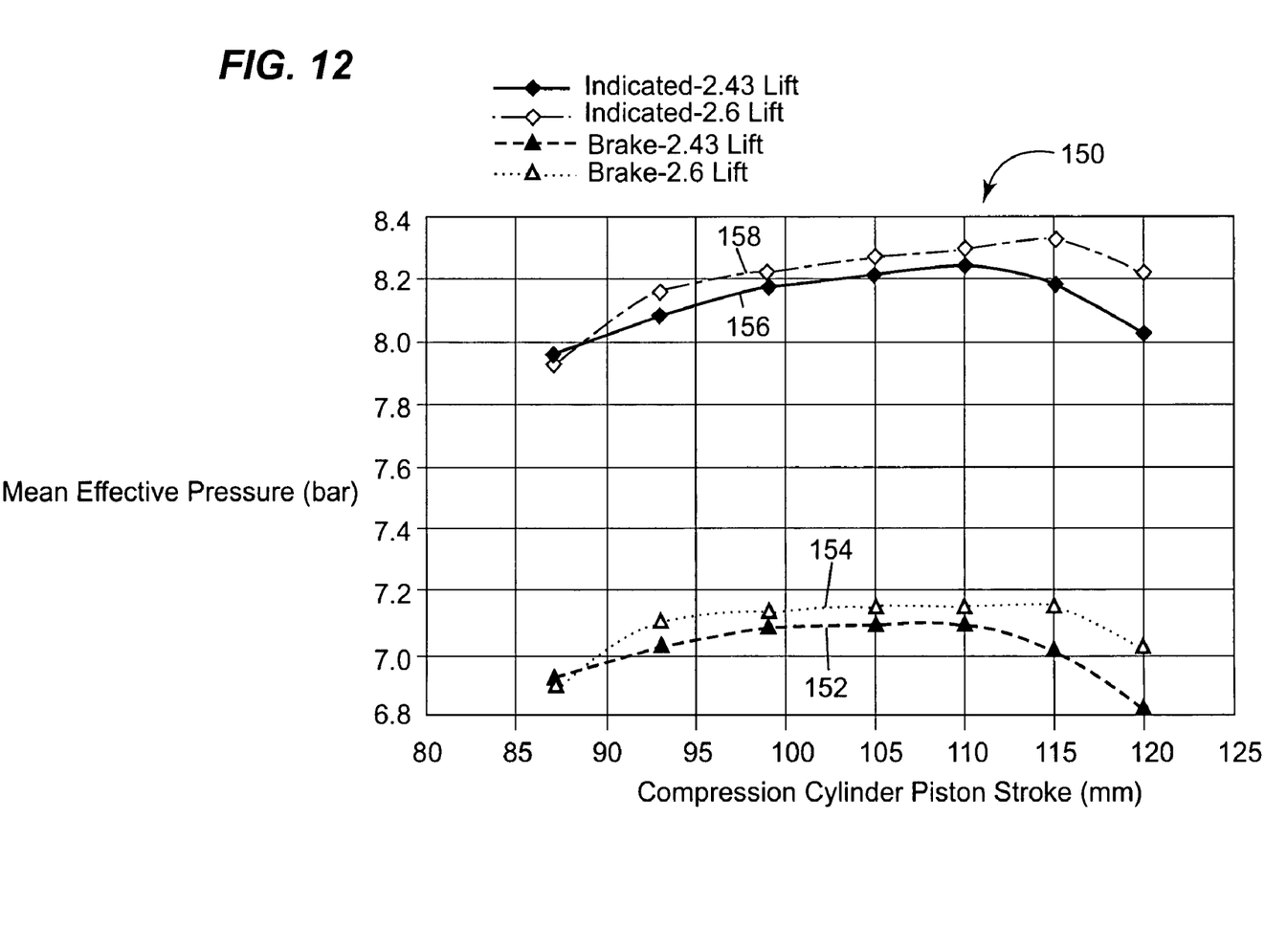
FIG. 12 is a graph of mean effective cylinder pressures comparing base and increased XovrC valve lifts over a range of compression cylinder piston strokes and displacements.
Figure 13:
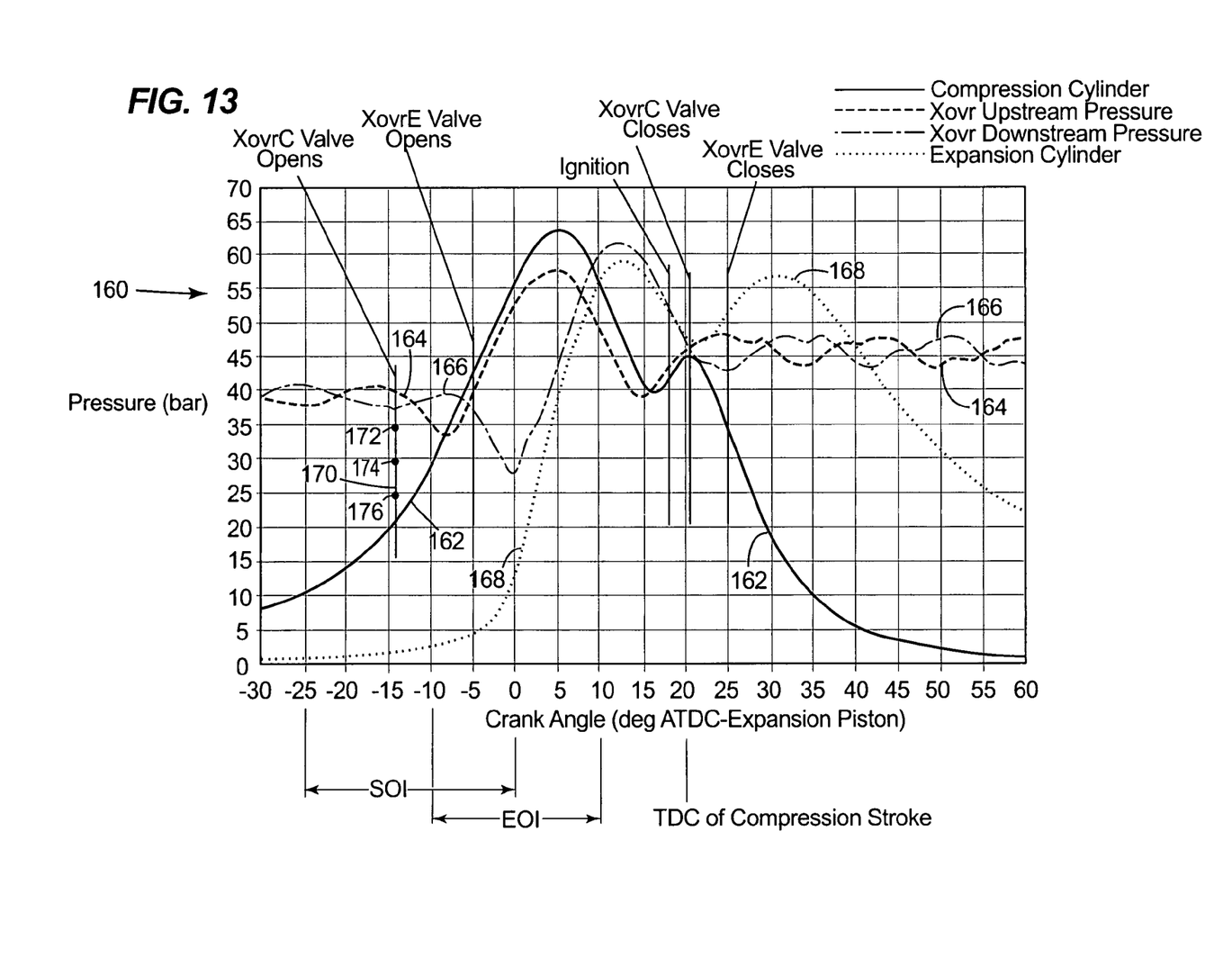
FIG. 13 is a graph of predicted pressures and timings of a naturally aspirated optimized split-cycle engine with an early opening XovrC valve timing of the invention.

Referring to FIG. 12, the resulting reduction in restriction, due to the higher peak valve lift of 2.60 mm, reduced pumping work and increased mean effective pressure, with the increase extending to longer compression cylinder piston strokes and larger displacements. This is illustrated in graph 150, which plots brake mean effective pressure vs. compression cylinder piston stroke for a 2.43 valve lift (curve 152) and a 2.60 valve lift (curve 154), as well as plots indicated mean effective pressure vs. compression cylinder piston stroke for a 2.43 valve lift (curve 156) and a 2.60 valve lift (curve 158). The reduction in cylinder pressures and the resulting reduction in friction of the reciprocating pistons, without a loss of air flow or maximum torque, provide an unexpected benefit of increased performance in operation of the split-cycle engine 50 of the present invention.

Referring to FIG. 12, graph 160 shows the predicted crossover passage 78, compression cylinder 66 and expansion cylinder 68 pressures vs. crank angle for a naturally aspirated optimized split-cycle engine 50 cycle simulation at 4000 RPM, 100% (full) engine load. Timings are shown for the XovrC valves 84, XovrE valves 86, spark plug 92 ignition, start of injection (SOI) range for injectors 90, end of injection (EOI) range for injectors 90 and end of compression stroke. Line 162 represents compression cylinder 66 pressure. Line 164 represents crossover passage upstream pressure (Xovr upstream pressure), i.e. the pressure taken at a point in the crossover passage 78 located right next to the XovrC valve 84 poppet head. Line 166 represents crossover passage downstream pressure (Xovr downstream pressure), i.e., the pressure at a point taken in the crossover passages located right next to the XovrE valve poppet head. Finally, line 168 represents expansion cylinder 68 pressure.

Note that at the timing line 170, where the XovrC valve opens early, there is a negative pressure differential across the XovrC valve 84 of approximately 20 bar. That is, at 14 degrees CA BTDC (i.e., −14 degrees CA ATDC) of the expansion cylinder piston (timing line 170), compression cylinder pressure 162 is approximately 20 bar less than the crossover passage upstream pressure 164.

Therefore, it is preferable for the XovrC valve 84 to open when the compression cylinder pressure 162 is at least 5 bar less (reference point 172 on timing line 170) than the crossover passage upstream pressure 164 at the XovrC valve. Additionally, it is more preferable for the XovrC valve 84 to open when the compression cylinder pressure 162 is at least 10 bar less (reference point 174 on timing line 170) than the crossover passage upstream pressure 164 at the XovrC valve. Moreover, it is most preferable for the XovrC valve 84 to open when the compression cylinder pressure 162 is at least 15 bar less (reference point 176 on timing line 170) than the crossover passage upstream pressure 164 at the XovrC valve.

Referring again to FIGS. 6 and 9, it is shown that both engine torque and air flow remain essentially constant when the XovrC valve opening timing is maintained in the range from 9.5 degrees BTDC to 14 degrees BTDC of the expansion cylinder. As noted above, advancing the timing of the XovrC valve has the benefits resulting from increased XovrC valve opening time.

Accordingly, it is apparent that it is preferable for the XovrC valve 84 to open at least 1.5 degrees crank angle before the pressure 162 in the compression cylinder reaches the upstream pressure 164 in the crossover passage at the XovrC valve 84. Additionally, it is more preferable for the XovrC valve 84 to open at least 3.0 degrees crank angle before the pressure 162 in the compression cylinder reaches the upstream pressure 164 in the crossover passage at the XovrC valve 84. Moreover, it is most preferable for the XovrC valve 84 to open at least 4.5 degrees crank angle before the pressure 162 in the compression cylinder reaches the upstream pressure 164 in the crossover passage at the XovrC valve 84.

Although the invention has been described by reference to specific embodiments, it should be understood that numerous changes may be made within the spirit and scope of the inventive concepts described. Accordingly, it is intended that the invention not be limited to the described embodiments, but that it have the full scope defined by the language of the following claims.

What is claimed is:

1. A split-cycle engine comprising:
    a crankshaft rotatable about a crankshaft axis of the engine;
    a compression piston slidably received within a compression cylinder and operatively connected to the crankshaft such that the compression piston reciprocates through an intake stroke and a compression stroke during a single rotation of the crankshaft;
    an expansion piston slidably received within an expansion cylinder and operatively connected to the crankshaft such that the expansion piston reciprocates through an expansion stroke and an exhaust stroke during a single rotation of the crankshaft; and
    a crossover passage interconnecting the compression and expansion cylinders, the crossover passage including a crossover compression (XovrC) valve and a crossover expansion (XovrE) valve defining a pressure chamber therebetween;

a control means operatively coupled to the crossover compression valve, the control means configured to open the crossover compression valve when the pressure in the compression cylinder is less than the upstream pressure in the crossover passage at the crossover compression valve.

2. The split-cycle engine of claim 1 wherein the crossover compression valve is timed to open when the pressure in the compression cylinder is at least 5 bar less than the upstream pressure in the crossover passage at the crossover compression valve.

3. The split-cycle engine of claim 2 wherein the crossover compression valve is timed to open when the pressure in the compression cylinder is at least 10 bar less than the upstream pressure in the crossover passage at the crossover compression valve.

4. The split-cycle engine of claim 3 wherein the crossover compression valve is timed to open when the pressure in the compression cylinder is at least 15 bar less than the upstream pressure in the crossover passage at the crossover compression valve.

5. The split-cycle engine of claim 1 wherein the crossover compression valve is timed to open at least 1.5 degrees crank angle before the pressure in the compression cylinder reaches the upstream pressure in the crossover passage at the crossover compression valve.

6. The split-cycle engine of claim 5 wherein the crossover compression valve is timed to open at least 3.0 degrees crank angle before the pressure in the compression cylinder reaches the upstream pressure in the crossover passage at the crossover compression valve.

7. The split-cycle engine of claim 6 wherein the crossover compression valve is timed to open at least 4.5 degrees crank angle before the pressure in the compression cylinder reaches the upstream pressure in the crossover passage at the crossover compression valve.

8. The split-cycle engine of claim 1 wherein the crossover compression valve opens outwardly from the compression cylinder.

9. A method of operating a split-cycle engine including a crankshaft rotatable about a crankshaft axis of the engine;

a compression piston slidably received within a compression cylinder and operatively connected to the crankshaft such that the compression piston reciprocates through an intake stroke and a compression stroke during a single rotation of the crankshaft;

an expansion piston slidably received within an expansion cylinder and operatively connected to the crankshaft such that the expansion piston reciprocates through an expansion stroke and an exhaust stroke during a single rotation of the crankshaft;

a crossover passage interconnecting the compression and expansion cylinders, the crossover passage including a crossover compression (XovrC) valve and a crossover expansion (XovrE) valve defining a pressure chamber therebetween; and a control means operatively coupled to the crossover compression valve;

the method comprising:

timing the crossover compression valve to open when the pressure in the compression cylinder is less than the upstream pressure in the crossover passage at the crossover compression valve.

10. The method of claim 9 including timing the crossover compression valve to open when the pressure in the compression cylinder is at least 5 bar less than the upstream pressure in the crossover passage at the crossover compression valve.

11. The method of claim 10 including timing the crossover compression valve to open when the pressure in the compression cylinder is at least 10 bar less than the upstream pressure in the crossover passage at the crossover compression valve.

12. The method of claim 11 including timing the crossover compression valve to open when the pressure in the compression cylinder is at least 15 bar less than the upstream pressure in the crossover passage at the crossover compression valve.

13. The method of claim 9 including timing the crossover compression valve to open at least 1.5 degrees crank angle before the pressure in the compression cylinder reaches the upstream pressure in the crossover passage at the crossover compression valve.

14. The method of claim 13 including timing the crossover compression valve to open at least 3.0 degrees crank angle before the pressure in the compression cylinder reaches the upstream pressure in the crossover passage at the crossover compression valve.

15. The method of claim 14 including timing the crossover compression valve to open at least 4.5 degrees crank angle before the pressure in the compression cylinder reaches the upstream pressure in the crossover passage at the crossover compression valve.

16. The method of claim 9 including opening the crossover compression valve outwardly from the compression cylinder.

* * * * *